US012809726B2

(12) United States Patent
Al-Sagga et al.

(10) Patent No.: US 12,809,726 B2
(45) Date of Patent: Nov. 24, 2026

(54) OFFSITE DATA SYNCHRONIZATION AND RECOVERY

(71) Applicant: Saudi Arabian Oil Company, Dhahran (SA)

(72) Inventors: Amro F. Al-Sagga, Khobar (SA); Mustafa S. Al-Gafli, Saihat (SA); Marwan A. Al-Muhaiteeb, Dhahran (SA); Abdulaziz M. Almohamed, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 13 days.

(21) Appl. No.: 18/830,690

(22) Filed: Sep. 11, 2024

(65) Prior Publication Data

US 2026/0072794 A1 Mar. 12, 2026

(51) Int. Cl.
*G06F 16/27* (2019.01)
*G06F 11/1446* (2026.01)

(52) U.S. Cl.
CPC .......... *G06F 11/1469* (2013.01); *G06F 16/27* (2019.01); *G06F 2201/80* (2013.01)

(58) Field of Classification Search
CPC .... G06F 11/1469; G06F 16/27; G06F 16/273; G06F 16/275; G06F 16/278; G06F 2201/80
USPC .......................................................... 707/634
See application file for complete search history.

(56) References Cited

U.S. PATENT DOCUMENTS 7,627,610 B2 * 12/2009 Takaoka ................ G06F 1/3203
10,365,982 B1 * 7/2019 Brooks ................. G06F 3/0611
11,010,258 B2 5/2021 Haridas et al.
11,463,264 B2 10/2022 Ngo
2005/0039069 A1 2/2005 Prahlad et al.
2006/0253731 A1 * 11/2006 Petruzzo ............. G06F 11/1466 714/6.2
2010/0070466 A1 3/2010 Prahlad et al.
2011/0093471 A1 4/2011 Brockway et al.
2014/0181031 A1 * 6/2014 Kumarasamy ........ G06F 3/0619 707/640

(Continued)

FOREIGN PATENT DOCUMENTS

EP 0205945 8/1993

OTHER PUBLICATIONS

Zhou et al., "LDFS: a Low Latency In-Line Data Deduplication File System," IEEE Access, 2018, 6:15743-15753, 10 pages.

*Primary Examiner* — Michael Pham
(74) *Attorney, Agent, or Firm* — Fish & Richardson P.C.

(57) ABSTRACT

A computer implemented method that enables offsite data synchronization and data recovery is described. The method includes performing a first replication of data from a data source at a first location to the main storage device, wherein the main storage device is online and first replication data is stored at the main storage device, performing a second replication of the first replication data stored at the main storage device according to a predetermined schedule, wherein the offline storage device is brought online and second replication data is stored at the offline storage device when the offline storage device is brought online, and wherein the offline storage device is taken offline when the second replication is complete, and restoring the first replication data or the second replication data to a target server.

18 Claims, 5 Drawing Sheets

(56) References Cited

U.S. PATENT DOCUMENTS

| | | | | |
|---|---|---|---|---|
| 2020/0042535 | A1* | 2/2020 | Joel | G06F 16/2365 |
| 2022/0114191 | A1* | 4/2022 | Peterson | G06F 16/273 |

* cited by examiner

OFFSITE DATA SYNCHRONIZATION AND RECOVERY

TECHNICAL FIELD

This disclosure relates generally to information management systems, and more particularly, offsite data synchronization and data recovery of data obtained during data synchronization and data recovery.

BACKGROUND

Current disaster recovery methods have several limitations including significant loss of business data when using periodic vault backups, long restoring times to restore information technology (IT) services from physical tape, lack of validation of data on tapes, complex infrastructure when restoring from tapes, and problems due to the run-time environment and configuration.

DETAILED DESCRIPTION

Offsite data synchronization and recovery is described. In particular, a device and workflow are described which together are configured to facilitate the replication of data from a data source into an online data storage device, and the subsequent replication of the data in the online data storage device to multiple different offline storage devices. The offline storage devices are periodically brought online and then offline to enable the subsequent replication. In examples, the device includes a main storage device (e.g., online data storage device) and secondary storage devices (e.g., offline data storage device). Each storage device supports PCIe connectivity and is coupled with a power supply, and each secondary storage device is coupled to the power supply by a switch and a timer.

Data replication and synchronization technologies support near instantaneous replication and synchronization of data across multiple locations and multiple systems. These technologies are crucial to various business systems, including financial trading platforms and real-time analytics. Some prior methods utilize data replication and synchronization techniques to provide recovery systems. However, many systems experience loss of data when attempting to recover data, and others suffer from excessively long restoration time when restoring services.

The current techniques provide a solution to the downfalls in data system recovery by providing multiple secured storage locations where a downsized version of business data can be stored. The system enables near zero loss of data, with very short recovery times. The data can be instantly validated at any point in time prior to recovery, and the run time environment and configuration data are transmitted to one or more remote storage devices, enabling the decrease in time required to recover data from the storage devices.

Some additional advantages of the present techniques include an improvement to communication speed between storage devices and the remote storage device allowing for faster and more reliable data transfer. The system enables high bandwidth and low latency communication. The system provides enhanced data security through the implementation of power isolation of the data storage devices. In addition, the system enables increased durability, enhanced reliability, and more power efficiency when compared to traditional recovery systems.

Figure 1:
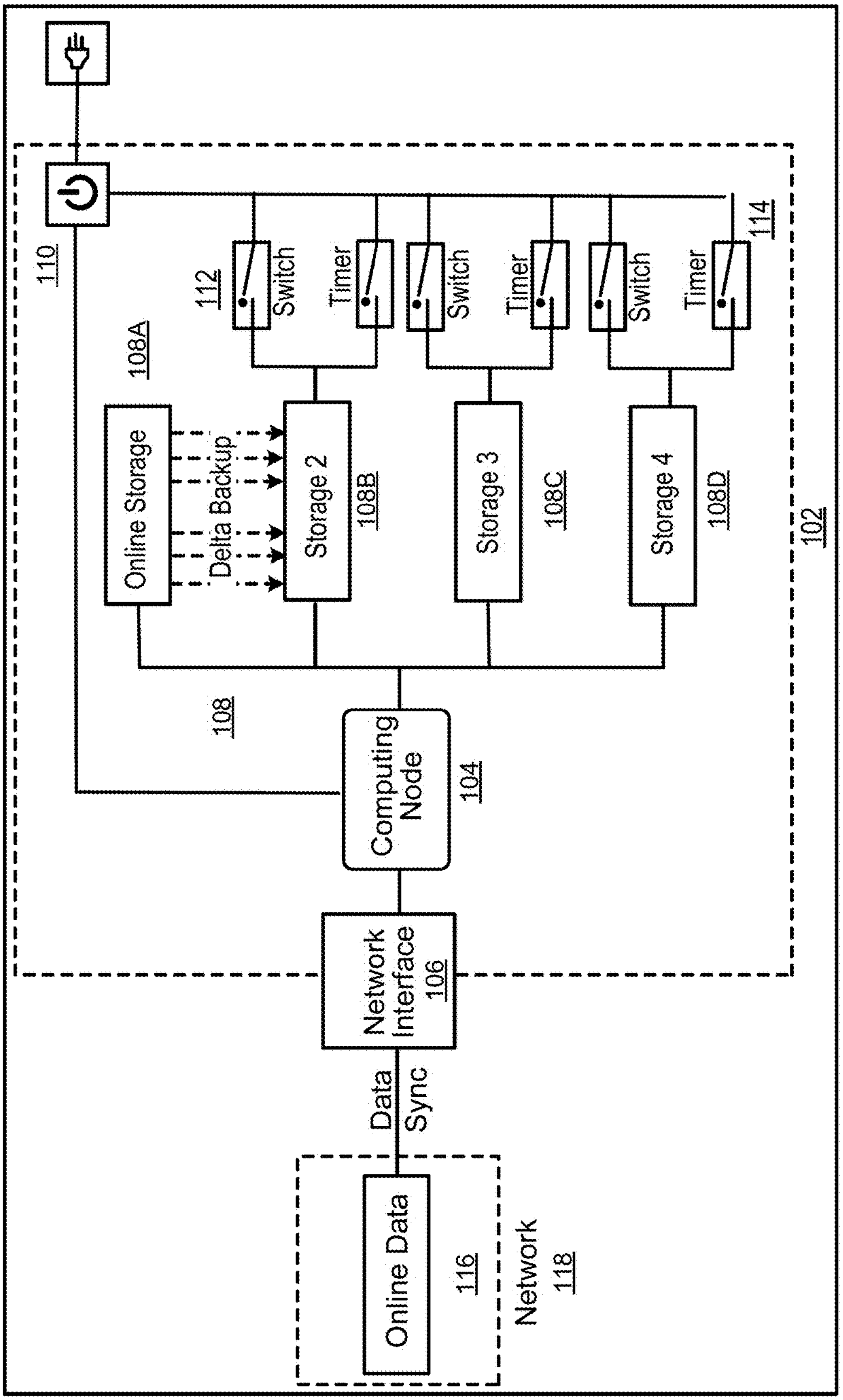
FIG. 1 shows an architecture/workflow that enables offsite data synchronization and data recovery.

FIG. 1 shows an architecture 100 that enables offsite data synchronization and data recovery. As illustrated, a data replication device 102 includes a computing node 104, a network interface 106, one or more storage devices 108A, 108B, 108C, and 108D (collectively referred to as storage devices 108), a power supply 110, one or more switches 112, and one or more timing devices 114. The data replication device 102 may be installed in a container/housing. The container can be lightweight and configured to be standalone. Each of the computing node 104, the network interface 106, the one or more storage devices 108, the power supply 110, one or more switches 112, and the one or more timing devices 114 may be housed in the container/housing. The data replication device 102 may be a portable device that can be used to replicate data to one or more multiple storage devices 108.

The computing node 104 of the data replication device 102 may be a computing device that manages the computation power of the data replication device 102. In some implementations, the computing node 104 may be a physical node. For example, the computing node 104 may be a single server or workstation with a processor, memory, and storage. In other implementations, the computing node 104 may be a virtual node. For example, the computing node 104 may be a virtual machine that can be managed by virtualization software. Virtualization occurs in some implementations and allows for more flexible operation of the data replication device 102.

The computing node 104 may be in communication with the network interface 106 and each of the multiple storage devices 108. The computing node 104 and the one or more storage devices 108 within the data replication device 102 can communicate with each other through the use of serial ATA (SATA) cables that are connected to serial attached SCSI (SAS) ports at the one or more storage devices 108. The network interface 106 is configured to allow the data replication device 102 to connect to a network 118, and to allow the data replication device 102 to communicate with other devices. The network interface 106 may support first generation (1G) mobile network technology and 10 G (10 Gigabit) per second network technology. In some examples, the network interface 106 may support multiple fifth generation (5G) network interfaces. The network interface 106 can manage the sending and receiving of data packets between the data replication device 102 and the network 118. The network interface 106 may be a hardware network interface that includes physical components to provide network connectivity. For example, the network interface 106 may be an ethernet interface. In some examples, the network interface 106 may be a software network interface that utilizes virtualization software to support virtual machines.

For example, the network interface 106 may be a Wi-Fi interface or a virtual ethernet adapter.

The power supply 110 is configured to provide power to the computing node 104, the network interface 106, and each of the multiple storage devices 108. In some embodiments, when the data replication device 102 is active, the power supply 110 of the device is connected to an external power source (not shown). Each of the multiple storage devices 108B, 108C, and 108D are coupled with the power supply 110 via one or more switches 112 and the one or more timing devices 114. In some embodiments, the one or more switches 112 and the one or more timing devices 114 are controlled by an end user. For example, the end user can configure the one or more timing devices based on their preferences. In particular, a user can configure the one or more timing devices to enable to power to the multiple storage devices 108B, 108C, and 108D according to a predetermined schedule. The predetermined schedule can be, for example, a period of time (e.g., fifteen minutes). In examples, the one or more switches 112 can be activated to enable power to the multiple storage devices 108B, 108C, and 108D instantaneously, or in real-time.

Each of the one or more storage devices 108 may be in communication with the computing node 104. The one or more storage device 108 may include an online storage device 108A and one or more other offline storage devices 108B, 108C, and 108D. Each of the one or more storage devices 108 may be detachable from the data replication device 102. The online storage device 108A may be used for up-to-date data sync. The one or more other offline storage devices 108B are protected via power and network isolation to prevent malicious access and sabotage. The one or more other offline storage devices 108B can be power isolated when a timer switch 112 is opened causing a physical disconnection between the power source and a particular storage device. Each of the one or more storage devices 108 may be solid state devices (SSD) that use solid state memory to store data. The one or more storage devices 108 are configured to read and write quicker than other types of storage devices. The one or more storage devices 108 are power efficient and produce less heat than traditional storage devices when in use. In some examples, the one or more storage devices 108 are non-volatile memory express (NVMe) storage devices. The NVMe storage devices utilize NVMe protocol over a Peripheral Component Interconnect Express (PCLe) bus to provide high speed data transfer and low latency in high performance computing environments.

A data source 116 may be used to store business data and business systems data. The data source 116 may store data associated with oil field operations. For example, the data source 116 may store exploration data, drilling data, production data, and management process data. The data that is stored at the data source 116 may be proprietary data. In some examples, the data source 116 is an active production system. In these examples, the data source 116 is live and currently supports one or more different business processes and or end-users. For example, the data source 116 can perform processes in real-time to support business operations. In other examples, the data source 116 is a passive secondary system. In these examples, the data source 116 can provide backup support or supplementary functions to assist one or more primary active systems.

The data stored at the data source 116 can be copied and replicated from the data source 116 to the online storage device 108A of the data replication device 102. The data source 116 and the data replication device 102 may communicate over the network 118 through the network interface 106 of the device 102. As described in more detail with reference to FIG. 2A-2C, replication of the data from the data source 116 to the online storage device 108A is performed by one or more different data replication methods. For example, the data may be replicated via deduplication replication. The data from the data source 116 is continuously copied and replicated to the online storage device 108A.

The data at the online storage device 108A is replicated to the one or more other offline storage devices 108B, 108C, and 108D. The data at the online storage device 108A is replicated using one or more different replication methods, such as deduplication, snapshot replication, or VMware site replication. In some implementations, the replication of the data at the online storage device 108A occurs at specific time periods. For example, the replication of the data at the online storage device 108A may occur every hour, every 24 hours, every 36 hours, or any other suitable time period. The user may have the ability to set the time period for how frequently data replication should occur. During the replication process, a target offline storage device 108B is connected to the network 118 to receive the replicated data. The target offline storage device 108B is then disconnected from the network 118 to return to its offline state when the data replication process is complete.

Figure 2A:
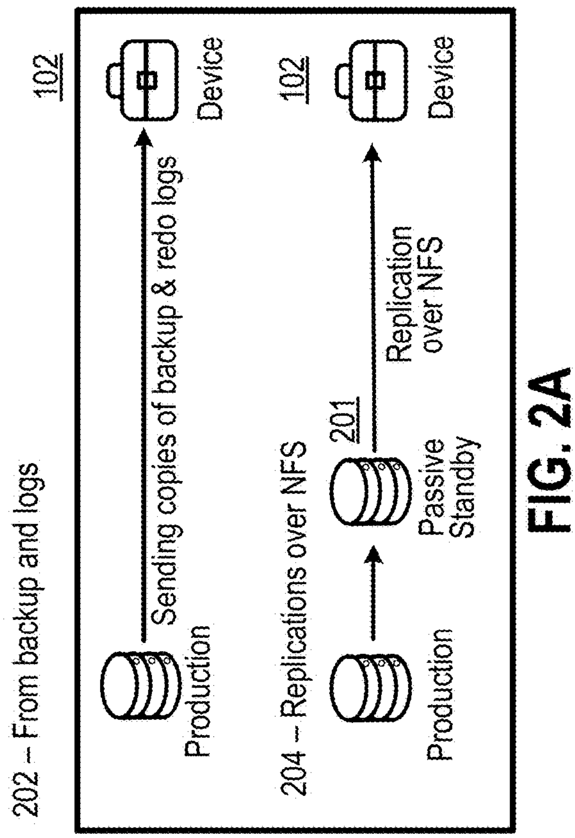
FIGS. 2A, 2B, and 2C show the steps involved in the process of data replication.
Figure 2B:
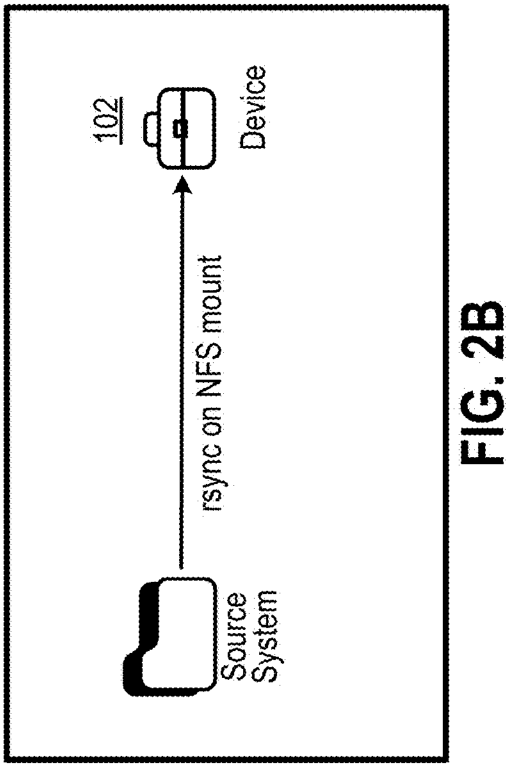
Figure 2C:
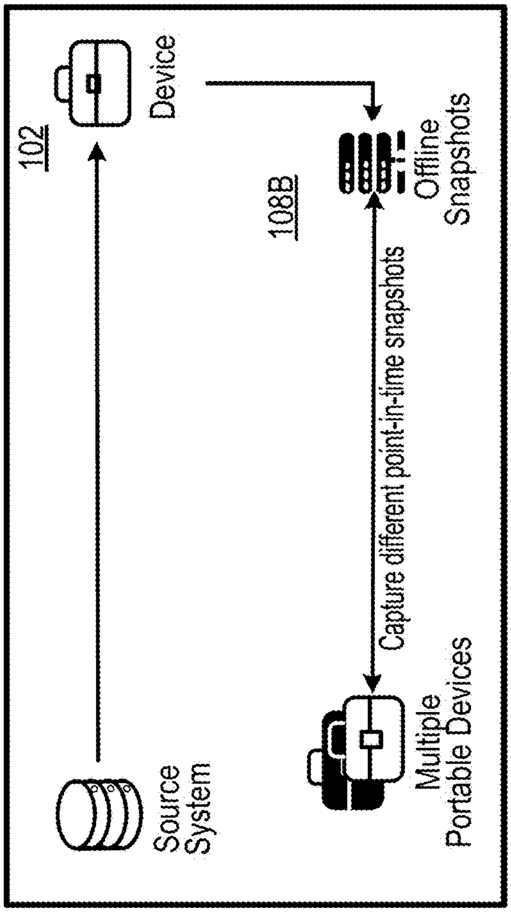

FIGS. 2A, 2B and 2C show the process of data replication performed by the data replication device 102. In examples, the data replication device 102 is the same as the data replication device described with respect to FIG. 1. As illustrated in FIG. 2A, at 202, data replication can be performed from production data stored in backup and logs. In the example of FIG. 2A, the data replication process begins with the data that is stored at the data source 116 being copied. The copy of the data is transmitted to the data replication device 102. The copy of the data is a consistent data copy of the data source. In some examples, the data replication device 102 is a portable device that is located at a location that is separate from the location of the production/data source 116. In some examples, the data replication device 102 may be located in the same location as the data source 116. The data source 116 may communicate the redo logs to the data replication device 102. The redo logs are database files that are generated to track any changes made to the records in the database. The redo logs ensure the durability and the integrity of the copied data by replicating any changes made during the recovery process. The redo logs may be stored as one or more log files on a disk at the data source 116. In some examples, the copied data and the redo logs are transmitted simultaneously from the data source 116 to the data replication device 102.

As illustrated in FIG. 2A, at 204, data replication can be performed from production data via a network file system (NFS) protocol. The data from the data source 116 is transmitted to a backup passive standby server 201. The passive standby server 201 is in communication with the data source 116 and the data replication device 102 over network 118. In some implementations, the passive standby server 201 may be located in the same location as the data source 116. In other implementations, the passive standby server 201 may be located in the same location as the data replication device 102. The passive standby server 201 may be configured to remain inactive when the data source 116 is active, and is kept in sync with the data source 116. The passive standby server 201 is configured to become active if the data source 116 fails, and to ensure that the data is consistent and ready in case of such failure.

Next, at 204, the data from the data source 116 is replicated via the network file system (NFS) protocol. The data files stored on the passive standby server 201 are accessed by the data replication device 102 over the network 118. The data replication device 102 performs a first replication of the data using one or more different replication methods. In some examples, the data replication device 102 replicates the data using deduplication replication. In examples where deduplication replication is used, the amount of data transfer required during the replication process is reduced by comparing the data source to the target data of replication, and only transferring blocks, bytes, or files which are changed. The data replication device 102 may be configured to continuously replicate the data until the device 102 is to be used for data recovery.

As illustrated in FIG. 2B, data replication can be performed from a source system to the data replication device 102 using rsync. In examples, rsync is a utility that enables the transfer and synchronization of files between source system and a storage device, such as the data replication device 102. The data replication device 102 ensures that the data on the NFS mount is consistent with the data stored at the passive standby server 201 and or the data stored at the data source 116.

As illustrated in FIG. 2C, data can be replicated from one or more storage devices, as an offline snapshot. The offline snapshot is an exact replica of the data on the storage device, and can be communicated to a second data replication device. FIG. 2C shows the scalability of the described invention when using one or more a data replication devices together.

Figure 3:
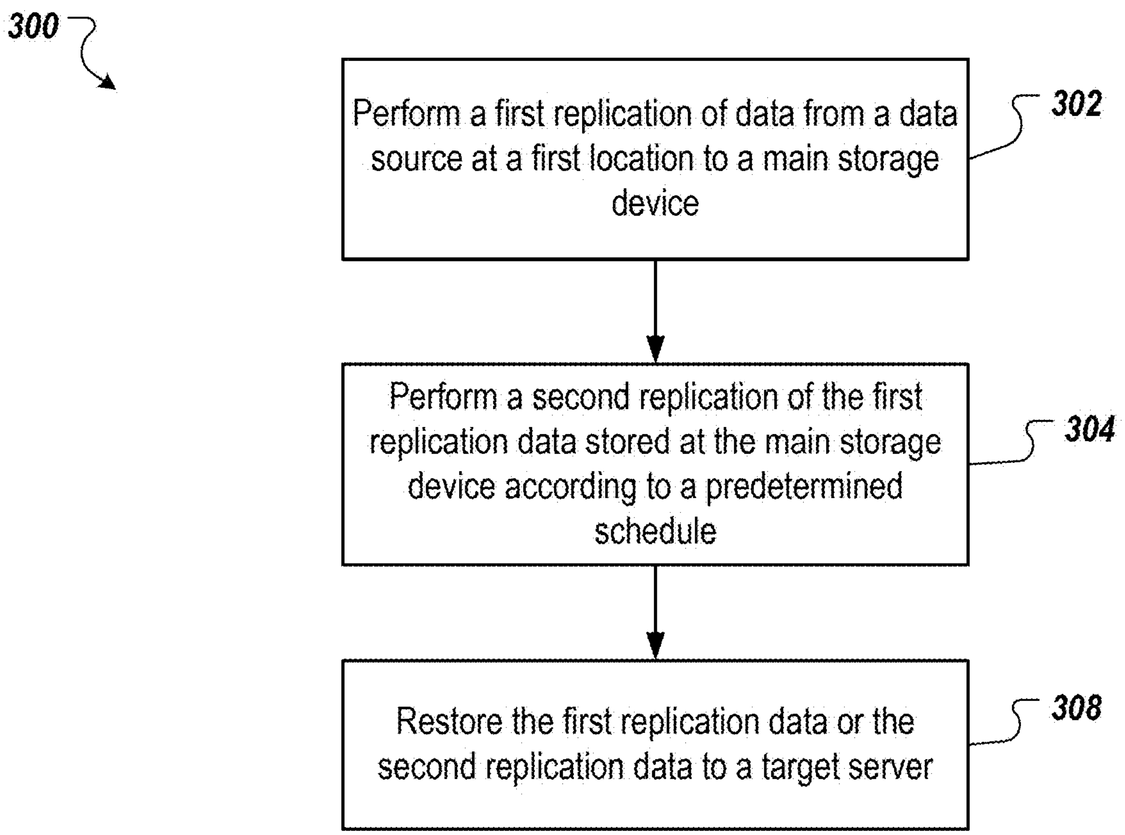
FIG. 3 is a process flow diagram of a process that enables offsite data synchronization and data recovery.

FIG. 3 is a process flow diagram of a process 300 that enables offsite data synchronization and data recovery. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order. Briefly, the process 300 may include performing a first replication of data from a data source at a first location to a main storage device (302), performing a second replication of the first replication data stored at the main storage device according to a predetermined schedule (304), and restoring the first replication data or the second replication data to a target server (306).

In more detail, process 300 may include performing a first replication of data from a data source at a first location to a main storage device (302). At block 302, for example, data from a data source 116 that is located at a first location is copied and then is replicated in a first replication. The data that is copied may be replicated by one or more different data replication methods based on the source data type. For example, the data may be replicated using deduplication replication. Deduplication replication may be used when large volumes of data are to be replicated across multiple different locations or systems. The deduplication replication process is used to optimize the efficiency of data replication of large volumes of data by eliminating the redundant copies of data. In other examples, snapshot replication, master-slave replication, multi-master replication, or peer-to-peer replication processes may be used.

After the first replication occurs, the first replication data may then be stored at the main storage device. The main storage device is an online storage device 108A that is connected to the network 118 that facilitates communication between one or more other devices and the online storage device. In some implementations, the data source 116 may be located in the same location as the online storage device 108A, and in other implementations, the data source 116 may be located in a location that is different from the location of the online storage device 108A.

Process 300 may include performing a second replication of the first replication data stored at the main storage device according to a predetermined schedule (304). At block 302, for example, the first replication data that is stored at the main storage device 108A may be replicated by one or more different replication methods. In some implementations, the second replication of the first replication data is carried out by the same replication method used in the first replication process. For example, when a deduplication replication process is used in the first replication process, then a deduplication replication process is used in the second replication process. In other implementations, the second replication of the first replication data is carried out by a different replication method than the method used in the first replication process. For example, when a deduplication replication is used in the first replication process, then master-slave replication is used in the second replication process.

The second replication data is stored at an offline storage device 108B. The offline storage device 108B may be one of multiple offline storage devices, and the offline storage device 108B may be brought online during the second replication process to store the second replication data. When the second replication process is complete, the offline storage device is taken back offline.

The second replication may occur based on a predetermined schedule. In some implementations, the second replication is performed after a period of time has passed, such as one or more hours, one or more days, or any other suitable period of time has passed. The second replication may occur based on a user set requirement. For example, the user may set an appropriate requirement for how often the second replication should occur. In some implementations, the second replication is performed when a threshold number of changes have been made to the data, and the data is no longer consistent with the first replication data. In some implementations, the first replication may be synchronous replication, and in other implementations, the first replication may be asynchronous replication.

Process 300 may include restoring the first replication data or the second replication data to a target server (306). Each of the one or more offline storage devices 108B may include a copy of installation files, one or more libraries, and one or more configuration files which are required to completely restore the system. The files at the offline storage devices 108B may be used to restore a target server to function similarly to the source server.

The replication data can be restored when required by a user. Data restoration can occur in one or more multiple different methods. In some implementations, the data can be restored when the data replication device 102 is disconnected from the data source network and is then connected to the data replication device 102 to the data restore target via the network interface. In other implementations, the data can be restored by detaching one of the multiple storage devices 108, moving the detached storage device to the data restore target, and connecting the detached storage device directly to the data restore target using, for example, a SATA cable. In some implementations, the data restore target can be a cloud server reachable via the network 118, or a physical server where connection via network or direct connection is possible.

The data restoration process provides flexibility by supporting data restore targets on a network (or cloud), or on one or more physical servers. The described process also provides the ability to detach the multiple storage devices 108 from the data replication device 102. The one or more multiple storage devices can be moved to any location and can connect directly to the data restore target, which allows for faster data transfer during the recovery process.

Figure 4:
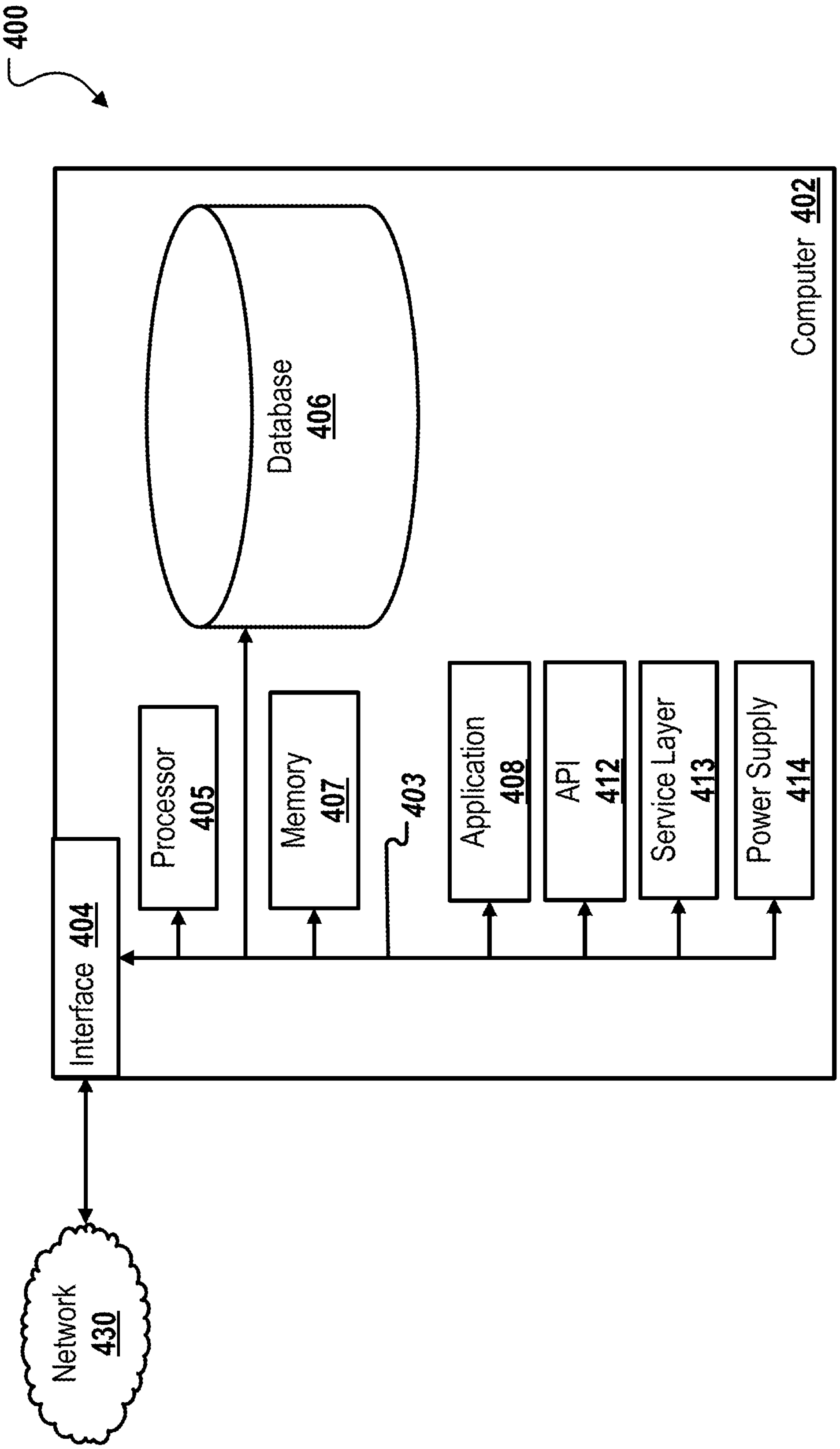
FIG. 4 is a block diagram illustrating an example of a computer-implemented system used to provide computational functionalities associated with described algorithms, methods, functions, processes, flows, and procedures, according to an implementation of the present disclosure.

FIG. 4 is a block diagram illustrating an example of a computer-implemented system 400 used to provide computational functionalities associated with described algorithms, methods, functions, processes, flows, and procedures, according to an implementation of the present disclosure. In the illustrated implementation, computer-implemented system 400 includes a Computer 402 and a Network 430.

The illustrated Computer 402 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 402 can include an input device, such as a keypad, keyboard, or touch screen, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as, for example, a client, network component, a server, or a database or another persistency, or a combination of roles for performing the subject matter described in the present disclosure. The illustrated Computer 402 is communicably coupled with a Network 430. In some implementations, one or more components of the Computer 402 can be configured to operate within an environment, or a combination of environments, including cloud-computing, local, or global.

At a high level, the Computer 402 is an electronic computing device operable to receive, transmit, process, store, or manage data and information associated with the described subject matter. According to some implementations, the Computer 402 can also include or be communicably coupled with a server, such as an application server, e-mail server, web server, caching server, or streaming data server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory or conventional database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402. The Database 406 can hold and operate on at least any data type mentioned or any data type consistent with this disclosure.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Figure 5:
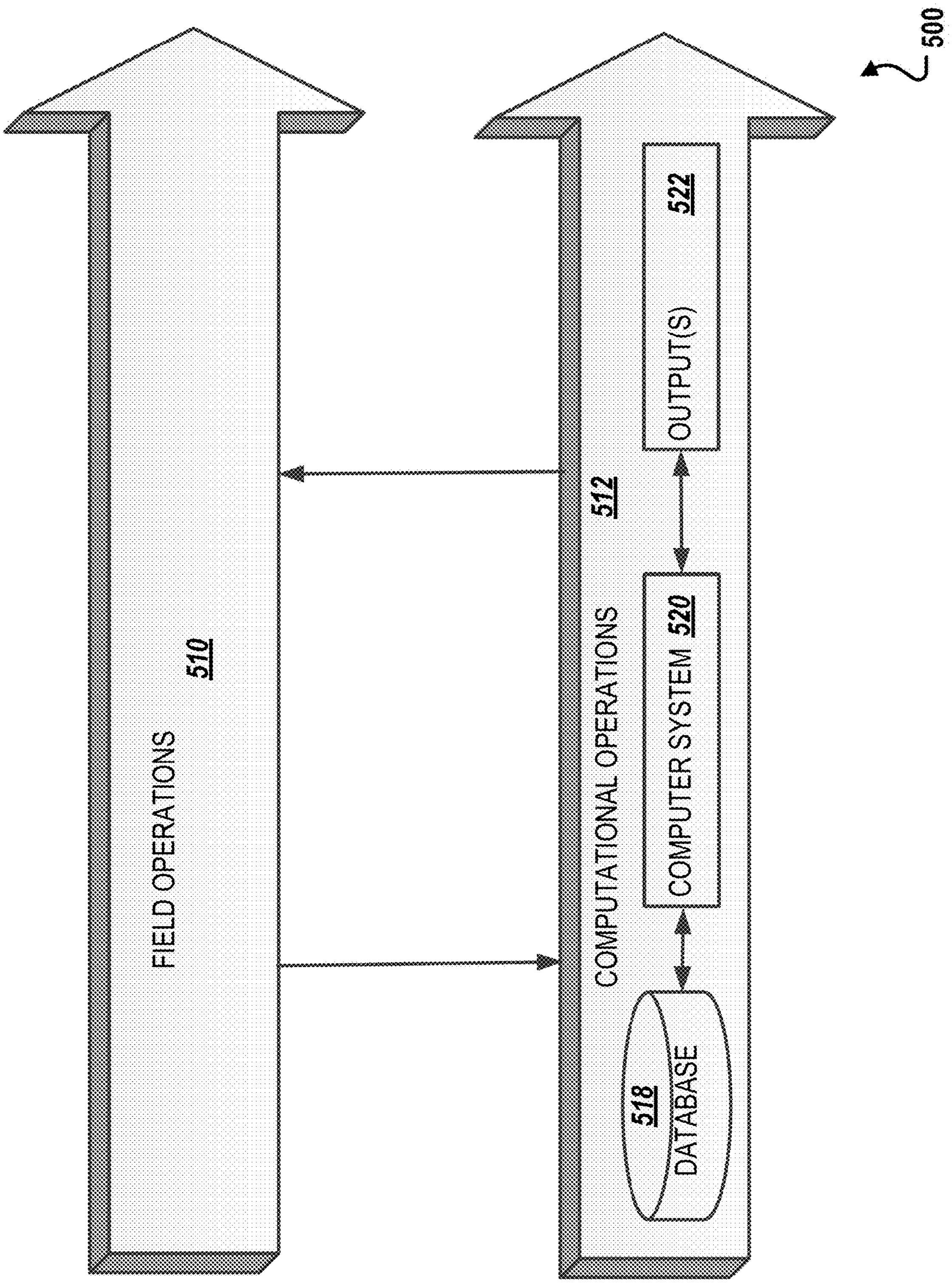
FIG. 5 illustrates hydrocarbon production operations that include both one or more field operations and one or more computational operations, which exchange information and control exploration for the production of hydrocarbons.

FIG. 5 illustrates hydrocarbon production operations 500 that include both one or more field operations 510 and one or more computational operations 512, which exchange information and control exploration for the production of hydrocarbons. In some implementations, outputs of techniques of the present disclosure can be performed before, during, or in combination with the hydrocarbon production operations 500, specifically, for example, either as field operations 510 or computational operations 512, or both.

Examples of field operations 510 include forming/drilling a wellbore, hydraulic fracturing, producing through the wellbore, injecting fluids (such as water) through the wellbore, to name a few. In some implementations, methods of the present disclosure can trigger or control the field operations 510. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 510 and responsively triggering the field operations 510 including, for example, generating plans and signals that provide feedback to and control physical components of the field operations 510. Alternatively or in addition, the field operations 510 can trigger the methods of the present disclosure. For example, implementing physical components (including, for example, hardware, such as sensors) deployed in the field operations 510 can generate plans and signals that can be provided as input or feedback (or both) to the methods of the present disclosure.

Examples of computational operations 512 include one or more computer systems 520 that include one or more processors and computer-readable media (e.g., non-transitory computer-readable media) operatively coupled to the one or more processors to execute computer operations to perform the methods of the present disclosure. The computational operations 512 can be implemented using one or more databases 518, which store data received from the field operations 510 and/or generated internally within the computational operations 512 (e.g., by implementing the methods of the present disclosure) or both. For example, the one or more computer systems 520 process inputs from the field operations 510 to assess conditions in the physical world, the outputs of which are stored in the databases 518. For example, seismic sensors of the field operations 510 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 512 where they are stored in the databases 518 and analyzed by the one or more computer systems 520.

In some implementations, one or more outputs 522 generated by the one or more computer systems 520 can be provided as feedback/input to the field operations 510 (either as direct input or stored in the databases 518). The field operations 510 can use the feedback/input to control physical components used to perform the field operations 510 in the real world.

For example, the computational operations 512 can process the seismic data to generate three-dimensional (3D) maps of the subsurface formation. The computational operations 512 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 512 to process new information about the formation and control the drilling to adjust to the observed conditions in real-time.

The one or more computer systems 520 can update the 3D maps of the subsurface formation as information from one exploration well is received and the computational operations 512 can adjust the location of the next exploration well based on the updated 3D maps. Similarly, the data received from production operations can be used by the computational operations 512 to control components of the production operations. For example, production well and pipeline data can be analyzed to predict slugging in pipelines leading to a refinery and the computational operations 512 can control machine operated valves upstream of the refinery to reduce the likelihood of plant disruptions that run the risk of taking the plant offline.

In some implementations of the computational operations 512, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A system, comprising:

a main storage device;

an offline storage device;

a power supply line selectively providing power to the offline storage device;

a hardware switch and a timing device, wherein the offline storage device is coupled to the power supply line via the hardware switch and the timing device; and a computing node communicably coupled to the main storage device and the offline storage device, the computing node comprising at least one processor and memory that stores instructions that, when executed by the at least one processor, cause the at least one processor to perform operations comprising:

performing a first replication of data from a data source at a first location to the main storage device, wherein the main storage device is online and first replication data is stored at the main storage device;

performing a second replication of the first replication data stored at the main storage device according to a predetermined schedule controlled by the timing device, wherein the timing device is configured to close the hardware switch to supply power to the offline storage device to bring the offline storage device online when the second replication is scheduled to begin and second replication data is stored at the offline storage device, wherein the timing device is configured to open the hardware switch to cause a physical disconnection between the power supply line and the offline storage device to power-isolate the offline storage device upon completion of the second replication; and restoring the first replication data or the second replication data to a target server.

2. The system of claim 1, wherein the main storage device and the offline storage device are detachable from the system.

3. The system of claim 1, wherein the offline storage device is protected by network isolation.

4. The system of claim 1, wherein the main storage device and the offline storage device are coupled with a controller using a high-speed serial connection.

5. The system of claim 1, wherein performing the first replication of the data comprises continuously copying and synchronizing the data from the data source to the main storage device.

6. The system of claim 1, wherein performing the second replication of the first replication data stored at the main storage device according to the predetermined schedule comprises copying and synchronizing the data from the main storage device to the offline storage device at a specified time period.

7. A computer-implemented method that enables offsite data synchronization and recovery, comprising:

performing a first replication of data from a data source at a first location to a main storage device, wherein the main storage device is online and first replication data is stored at the main storage device;

performing a second replication of the first replication data stored at the main storage device according to a predetermined schedule controlled by a timing device, wherein the timing device is configured to close a hardware switch to supply power to at least one offline storage device of multiple offline storage devices to bring the at least one offline storage device online when the second replication is scheduled to begin, and second replication data is stored at the at least one offline storage device, wherein the timing device is configured to open the hardware switch to cause a physical disconnection between a power supply line and the at least one offline storage device to power-isolate the at least one offline storage device upon completion of the second replication; and restoring the first replication data or the second replication data to a target server.

8. The method of claim 7, wherein the data source is an active production system.

9. The method of claim 7, wherein the data source is a passive secondary system.

10. The method of claim 7, wherein performing the first replication of the data comprises continuously copying and synchronizing the data from the data source to the main storage device.

11. The method of claim 7, wherein performing the second replication of the first replication data stored at the main storage device according to the predetermined schedule comprises copying and synchronizing the data from the main storage device to the at least one offline storage device at a specified time period.

12. The method of claim 7, wherein performing the second replication of the first replication data stored at the main storage device according to the predetermined schedule comprises:

identifying the at least one offline storage device to store the second replication data;

initiating a connection to a network for the identified offline storage device;

performing the second replication; and ending the connection to the network.

13. The method of claim 7, wherein performing the second replication of the first replication data comprises, transferring data reduced by comparing source data to target data and transferring blocks, bytes, or files which are changed.

14. The method of claim 8, wherein the multiple offline storage devices are each remote devices.

15. An apparatus comprising a non-transitory, computer readable, storage medium that stores instructions that, when executed by at least one processor, cause the at least one processor to perform operations comprising:

performing a first replication of data from a data source at a first location to a main storage device, wherein the main storage device is online and first replication data is stored at the main storage device;

performing a second replication of the first replication data stored at the main storage device according to a predetermined schedule controlled by a timing device, wherein the timing device is configured to close a hardware switch to supply power to an offline storage device to bring the offline storage device online when the second replication is scheduled to begin, and second replication data is stored at the offline storage device, wherein the timing device is configured to open the hardware switch to cause a physical disconnection between a power supply line and the offline storage device to power-isolate the offline storage device upon completion of the second replication; and restoring the first replication data or the second replication data to a target server.

16. The non-transitory, computer readable, storage medium of claim 15, wherein the main storage device and the offline storage device are detachable from a system where the main storage device and the offline storage device are communicably coupled.

17. The non-transitory, computer readable, storage medium of claim 15, wherein the offline storage device is protected by power and network isolation.

18. The non-transitory, computer readable, storage medium of claim 15, wherein the main storage device and the offline storage device are coupled with a controller using a high-speed serial connection.

* * * * *